(12) United States Patent
Kunkes et al.

(10) Patent No.: US 12,472,487 B2
(45) Date of Patent: Nov. 18, 2025

(54) Cu-CHA SCR CATALYSTS HAVING SPECIFIC LATTICE STRAIN AND DOMAIN SIZE CHARACTERISTICS

(71) Applicant: BASF MOBILE EMISSIONS CATALYSTS LLC, Iselin, NJ (US)

(72) Inventors: Eduard L. Kunkes, Iselin, NJ (US); Karl C. Kharas, Iselin, NJ (US)

(73) Assignee: BASF Mobile Emissions Catalysts LLC, Iselin, NJ (US)

(*) Notice: Subject to any disclaimer, the term of this patent is extended or adjusted under 35 U.S.C. 154(b) by 763 days.

(21) Appl. No.: 17/753,554

(22) PCT Filed: Sep. 24, 2020

(86) PCT No.: PCT/IB2020/058953
§ 371 (c)(1),
(2) Date: Mar. 8, 2022

(87) PCT Pub. No.: WO2021/059197
PCT Pub. Date: Apr. 1, 2021

(65) Prior Publication Data
US 2022/0331787 A1    Oct. 20, 2022

Related U.S. Application Data

(60) Provisional application No. 62/905,594, filed on Sep. 25, 2019.

(51) Int. Cl.
*B01J 29/76*    (2006.01)
*B01D 53/94*    (2006.01)
(Continued)

(52) U.S. Cl.
CPC ........ *B01J 29/763* (2013.01); *B01D 53/9418* (2013.01); *B01D 53/9436* (2013.01);
(Continued)

(58) Field of Classification Search
CPC ........... B01D 53/9418; B01D 53/9436; B01D 53/944; B01D 53/9477; B01D 2251/2062;
(Continued)

(56) References Cited

U.S. PATENT DOCUMENTS 6,656,347 B2 * 12/2003 Stockwell ................ B01J 35/31
   502/64
6,685,897 B1    2/2004 Penetrante et al.
(Continued)

FOREIGN PATENT DOCUMENTS

CN    104736241 A    6/2015
CN    108883403 A    11/2018
(Continued)

OTHER PUBLICATIONS

"X-ray Diffraction Analysis Technology," edited by Jin Yong et al., Defense Industry Press, pp. 261-274, Jul. 31, 2008, Abstract in English only.
(Continued)

*Primary Examiner* — Dapinder Singh
(74) *Attorney, Agent, or Firm* — DLA Piper LLP (US)

(57) ABSTRACT

The present disclosure provides catalyst compositions capable of reducing nitrogen oxide ($NO_x$) emissions in engine exhaust. The catalyst compositions include metal ion-exchanged zeolites having a domain size of less than about 1500 Ångstroms (Å), a crystallographic strain of less than about 0.7%, or both. Further provided are catalyst articles coated with such compositions, processes for preparing such catalyst compositions and articles, an exhaust gas treatment system including such catalytic articles, and methods for reducing $NO_x$ in an exhaust gas stream using such catalytic articles and systems.

29 Claims, 8 Drawing Sheets

(51) Int. Cl.
*B01J 35/56* (2024.01)
*C01B 33/26* (2006.01)
*F01N 3/20* (2006.01)
*B01J 35/57* (2024.01)

(52) U.S. Cl.
CPC ....... *B01D 53/944* (2013.01); *B01D 53/9477* (2013.01); *B01J 35/56* (2024.01); *C01B 33/2869* (2013.01); *F01N 3/2066* (2013.01); *B01D 2255/20761* (2013.01); *B01D 2255/50* (2013.01); *B01D 2255/9155* (2013.01); *B01J 35/57* (2024.01)

(58) Field of Classification Search
CPC .. B01D 2251/2067; B01D 2255/20761; B01D 2255/50; B01D 2255/9155; B01D 2258/012; B01J 29/763; B01J 35/56; C01B 39/48; F01N 3/2066; F01N 3/28; F01N 2610/02; F01N 2370/00; F01N 2370/02; F01N 2370/04; Y02A 50/20; Y02T 10/12
See application file for complete search history.

(56) References Cited

U.S. PATENT DOCUMENTS

| | | | | |
|---|---|---|---|---|
| 6,942,784 | B2* | 9/2005 | Stockwell | B01J 35/70 502/79 |
| 8,999,224 | B2* | 4/2015 | Beall | B01D 46/2429 264/630 |
| 11,739,670 | B2* | 8/2023 | Beall | B01D 46/2425 428/116 |
| 11,890,609 | B2* | 2/2024 | George | B01J 21/066 |
| 2004/0120873 | A1 | 6/2004 | Tran et al. | |
| 2010/0126132 | A1* | 5/2010 | Merkel | B01D 46/24493 55/523 |
| 2010/0156010 | A1* | 6/2010 | Merkel | C04B 35/195 264/628 |
| 2011/0039102 | A1 | 2/2011 | Chaumonnot et al. | |
| 2011/0293883 | A1* | 12/2011 | Miao | B01D 46/24491 428/116 |
| 2012/0027673 | A1 | 2/2012 | Larsen et al. | |
| 2014/0112852 | A1 | 4/2014 | Mohanan et al. | |
| 2017/0043328 | A1 | 2/2017 | Zhang et al. | |
| 2018/0339288 | A1 | 11/2018 | Petrovic | |

FOREIGN PATENT DOCUMENTS

| | | |
|---|---|---|
| CN | 111936843 A | 11/2020 |
| JP | 2014-155921 A1 | 8/2014 |
| JP | 2019505460 A | 2/2019 |
| JP | 2019073704 A | 5/2019 |
| WO | 2015/195809 A1 | 12/2015 |
| WO | 2015/195819 A1 | 12/2015 |
| WO | 2017100384 A1 | 6/2017 |
| WO | WO 2018/201046 A1 | 11/2018 |
| WO | 2019157416 A1 | 8/2019 |

OTHER PUBLICATIONS

International Search Report dated Jan. 4, 2021, PCT/IB2020058953.
Meng, Lingqian et al., "Direct synthesis of hierarchical ZSM-5 zeolite using . . . ," Catalysis Science & Technology, vol. 7, No. 19, Sep. 15, 2017, pp. 4520-4533.
Extended European Search Report dated Jun. 26, 2023, of counterpart European Patent Application No. 20870368.3.
Communication Pursuant to Rules 70(2) and 70a(2) EPC dated Jul. 13, 2023, of counterpart European Patent Application No. 20870368.3.
Notice of First Examination Opinion dated Jul. 27, 2023, of counterpart Chinese Patent Application No. 202080065741.1, along with an English machine translation.
Lu et al, "Applications of Magnetic Nanoparticles to Separation and Catalysis," Petrochemical Industry, Issue 12, pp. 1225-1235, 2008, Abstract only in English.
Konysheva et al, "Effect of Structural, Size, and Acid Characteristics of Hierarchical BEA and MOR Zeolites on their Activity in the Catalytic Reduction of $N_2O$ and NO by Propylene," Theoretical and Experimental Chemistry, 52, pp. 90-96, 2016, Abstract only in English.

* cited by examiner

Cu-CHA SCR CATALYSTS HAVING SPECIFIC LATTICE STRAIN AND DOMAIN SIZE CHARACTERISTICS

This application is a national stage filing under 35 U.S.C. § 371 of International Application No. PCT/IB2020/058953, filed on Sep. 24, 2020, which claims the benefit of priority to U.S. Provisional Application No. 62/905,594, filed on Sep. 25, 2019; the disclosure of each of these applications are each incorporated herein by reference in their entirety.

FIELD OF THE DISCLOSURE

The present disclosure relates generally to the field of exhaust gas treatment catalysts, particularly catalyst compositions capable of selectively reducing nitrogen oxides in engine exhaust, catalyst articles coated with such compositions, and processes for preparing such catalyst compositions. More particularly are provided improved metal promoted zeolites that can be useful as Selective Catalytic Reduction (SCR) catalysts, and processes for their preparation.

BACKGROUND

Over time, the harmful components of nitrogen oxides ($NO_x$) have led to atmospheric pollution. $NO_x$ is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower molecular weight hydrocarbon is used as a reducing agent; and (2) a selective reduction process wherein ammonia or an ammonia precursor is used as a reducing agent. In the selective reduction process, a high degree of nitrogen oxide removal can be achieved with a stoichiometric amount of reducing agent.

The selective reduction process is referred to as a SCR (Selective Catalytic Reduction) process. The SCR process uses catalytic reduction of nitrogen oxides with a reductant (e.g., ammonia) in the presence of atmospheric oxygen, resulting in the formation predominantly of nitrogen and steam:

$$4NO + 4NH_3 + O_2 \rightarrow 4N_2 + 6H_2O \quad \text{(standard SCR reaction)}$$

$$2NO_2 + 4NH_3 + O_2 \rightarrow 3N_2 + 6H_2O \quad \text{(slow SCR reaction)}$$

$$NO + NO_2 + 2NH_3 \rightarrow 2N_2 + 3H_2O \quad \text{(fast SCR reaction)}$$

Catalysts employed in the SCR process ideally should be able to retain good catalytic activity over a wide range of temperature conditions of use, for example, 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Current catalysts employed in the SCR process include metal-promoted zeolites, which have been used in SCR of nitrogen oxides with a reductant such as ammonia, urea, or a hydrocarbon in the presence of oxygen. Metal-promoted zeolite SCR catalysts including, among others, iron-promoted and copper-promoted zeolite catalysts, are known. For example, iron-promoted zeolite beta has been an effective commercial catalyst for the selective reduction of nitrogen oxides with ammonia. Unfortunately, it has been found that under harsh hydrothermal conditions (e.g., as exhibited during the regeneration of a soot filter with temperatures locally exceeding 700° C.), the activity of many metal-promoted zeolites begins to decline. This decline has been attributed to dealumination of the zeolite and the consequent loss of metal-containing active centers within the zeolite. Metal-promoted, particularly copper-promoted, aluminosilicate zeolites having the CHA structure type have elicited a high degree of interest as catalysts for the SCR of oxides of nitrogen in lean burning engines using nitrogenous reductants. These materials exhibit activity within a wide temperature window and excellent hydrothermal durability, as described in U.S. Pat. No. 7,601,662. Although the catalysts described in U.S. Pat. No. 7,601,662 exhibit excellent properties, rendering them useful e.g., in the context of SCR catalysis, there is a continued desire for metal promoted zeolitic SCR catalysts with improved low temperature performance and enhanced hydrothermal stability relative to currently available metal promoted zeolitic SCR catalysts. Light duty diesel (LDD) applications, where the SCR catalyst is often exposed to temperature excursions associated with soot filter regeneration, place particular demand on hydrothermal stability of the zeolite. Although hydrothermal stability generally increases with decreasing framework alumina content (i.e., with increasing silica-to-alumina molar ratio or SAR), the latter also limits the amount of catalytically active Cu sites. To that end, enhancement in hydrothermal stability of lower SAR frameworks would present an effective strategy for LDD performance improvement.

SUMMARY OF THE DISCLOSURE

The present disclosure generally provides zeolite materials characterized by specific domain size and crystallographic strain values. Such zeolite materials, promoted with a metal, provide selective catalytic reduction (SCR) catalysts with enhanced $NO_x$ reduction performance. Surprisingly, it has been found according to the present disclosure that zeolite materials characterized by a domain size of less than about 1500 Ångstroms (Å), a crystallographic strain of less than about 0.7%, or both, results in metal-promoted SCR catalyst compositions with superior $NO_x$ reduction performance at both high and low temperatures.

Accordingly, in one aspect is provided a zeolite material characterized by one or more of the following: a domain size of less than about 1500 Å; a crystallographic strain of less than about 0.7% as determined from the LY parameter from a General Structure Analysis System (GSAS) Rietveld refinement of powder X-ray diffraction data. In some embodiments, the domain size is less than about 1400 Å. In some embodiments, the domain size is less than about 1300 Å. In some embodiments, the domain size is from about 800 to about 1400 Å. In some embodiments, the crystallographic strain is less than about 0.6%.

In some embodiments, the crystallographic strain is less than about 0.5%. In some embodiments, the crystallographic strain is less than about 0.4%

In some embodiments, the domain size is from about 800 to about 1200 Å, and the crystallographic strain is from about 0.2% to about 0.6%. In some embodiments, the domain size is from about 800 to about 1100 Å, and the crystallographic strain is from about 0.3% to about 0.5%.

In some embodiments, the zeolite material is selected from the group consisting of an aluminosilicate zeolite, a borosilicate, a gallosilicate, a SAPO, and ALPO, a MeAPSO, and a MeAPO. In some embodiments, the zeolite material is an aluminosilicate zeolite. In some embodiments, the zeolite material is an aluminosilicate zeolite having a silica-to-alumina ratio (SAR) in the range of about 10 to about 45. In some embodiments, the SAR is in the range of about 15 to about 20.

In some embodiments, the zeolite material has a CHA crystalline framework. In some embodiments, the zeolite material is selected from the group consisting of SSZ-13, SSZ-62, natural chabazite, zeolite K-G, Linde D, Linde R, LZ-218, LZ-235, LZ-236, ZK-14, SAPO-34, SAPO-4, SAPO-47, and ZYT-6. In some embodiments, the zeolite material is chabazite (CHA).

In another aspect is provided a selective catalytic reduction (SCR) catalyst composition effective for the abatement of nitrogen oxides ($NO_x$) in an exhaust gas stream, the SCR catalyst composition comprising the zeolite material as disclosed herein, promoted with a metal selected from iron, copper, and combinations thereof. In some embodiments, the promoter metal is present in an amount of about 1.0 wt % to about 10 wt %, based on the total weight of the SCR catalyst and calculated as the metal oxide. In some embodiments, the promoter metal is present in an amount of about 4 to about 6 wt %. In some embodiments, the promoter metal is copper.

In another aspect is provide an SCR catalyst article effective to abate nitrogen oxides ($NO_x$) from a lean burn engine exhaust gas, the SCR catalyst article comprising a substrate having the selective catalytic reduction (SCR) catalyst composition as disclosed herein, disposed on at least a portion thereof. In some embodiments, the substrate is a honeycomb substrate. In some embodiments, the honeycomb substrate is a flow-through substrate or a wall-flow filter.

In some embodiments, at least a portion of the $NO_x$ in the exhaust gas stream is reduced to $N_2$ at a temperature between about 200° C. and about 600° C. In some embodiments, the $NO_x$ level in the exhaust gas stream is reduced by at least 50% at 200° C. In some embodiments, the $NO_x$ level in the exhaust gas stream is reduced by at least 70% at 600° C.

In some embodiments, the SCR catalyst article, after a thermal aging treatment conducted at 800° C. for 16 hours in the presence of 10 vol % steam and the balance air, exhibits an abatement of the NOx in the exhaust gas stream of about 72% or greater at 200° C., about 81% or greater at 600° C., or both, when the SCR catalyst article is tested under the following conditions: the SCR catalyst composition is disposed on a cellular ceramic monolith having a cell density of 400 cpsi and a wall thickness of 6 mil at a catalyst loading of 2.1 g/in$^3$, at an exhaust gas hourly volume-based space velocity of 80,000 h$^{-1}$ under pseudo-steady state conditions, the exhaust gas comprising a gas mixture of 500 ppm NO, 500 ppm $NH_3$, 10% $O_2$, 5% $H_2O$, and the balance $N_2$.

In another aspect is provided an exhaust gas treatment system comprising the SCR catalyst article as disclosed herein, positioned downstream from and in fluid communication with a lean burn engine that produces an exhaust gas stream. In some embodiments, the exhaust gas treatment system further comprises one or more of the following: a diesel oxidation catalyst (DOC) positioned upstream of the SCR catalyst article; a soot filter positioned upstream of the SCR catalyst article; an ammonia oxidation catalyst (AMOx) positioned downstream of the SCR catalyst article.

In another aspect is provided a method of treating an exhaust gas stream from a lean burn engine, the method comprising contacting the exhaust gas stream with the catalyst article or the exhaust gas treatment system as disclosed herein, for a time and at a temperature sufficient to reduce the level of nitrogen oxides (NOx) in the exhaust gas stream. In some embodiments, the $NO_x$ level in the exhaust gas stream is reduced to $N_2$ at a temperature between about 200° C. and about 600° C.

The invention includes, without limitation, the following embodiments.

Embodiment 1: A zeolite material characterized by one or more of the following: a domain size of less than about 1500 Ångstroms (Å); a crystallographic strain of less than about 0.7% as determined from the LY parameter from a General Structure Analysis System (GSAS) Rietveld refinement of powder X-ray diffraction data.

Embodiment 2: The zeolite material of embodiment 1, wherein the domain size is less than about 1400 Å.

Embodiment 3: The zeolite material of embodiments 1 or 2, wherein the domain size is less than about 1300 Å.

Embodiment 4: The zeolite material of any one of embodiments 1-3, wherein the domain size is from about 800 to about 1400 Å.

Embodiment 5: The zeolite material of any one of embodiments 1-4, wherein the crystallographic strain is less than about 0.6%.

Embodiment 6: The zeolite material of any one of embodiments 1-5, wherein the crystallographic strain is less than about 0.5%.

Embodiment 7: The zeolite material of any one of embodiments 1-6, wherein the crystallographic strain is less than about 0.4%.

Embodiment 8: The zeolite material of any one of embodiments 1-7, wherein the domain size is from about 800 to about 1200 Å, and the crystallographic strain is from about 0.2% to about 0.6%.

Embodiment 9: The zeolite material of any one of embodiments 1-8, wherein the domain size is from about 800 to about 1100 Å, and the crystallographic strain is from about 0.3% to about 0.5%.

Embodiment 10: The zeolite material of any one of embodiments 1-9, wherein the zeolite material is an aluminosilicate zeolite.

Embodiment 11: The zeolite material of any one of embodiments 1-10, having a silica-to-alumina ratio (SAR) in the range of about 10 to about 45.

Embodiment 12: The zeolite material of any one of embodiments 1-11, having a SAR in the range of about 15 to about 20.

Embodiment 13: The zeolite material of any one of embodiments 1-12, wherein the zeolite material has a CHA crystalline framework.

Embodiment 14: The zeolite material of any one of embodiments 1-13, wherein the zeolite material is selected from the group consisting of SSZ-13, SSZ-62, natural chabazite, zeolite K-G, Linde D, Linde R, LZ-218, LZ-235, LZ-236, ZK-14, SAPO-34, SAPO-4, SAPO-47, and ZYT-6.

Embodiment 15: A selective catalytic reduction (SCR) catalyst composition effective for the abatement of nitrogen oxides ($NO_x$) in an exhaust gas stream, the SCR catalyst composition comprising the zeolite material according to any one of embodiments 1 to 14, promoted with a metal selected from iron, copper, and combinations thereof.

Embodiment 16: The SCR catalyst composition of embodiment 15, wherein the promoter metal is present in an amount of about 1.0 wt % to about 10 wt %, based on the total weight of the SCR catalyst and calculated as the metal oxide.

Embodiment 17: The SCR catalyst of any one of embodiments 15-16, wherein the promoter metal is present in an amount of about 4 to about 6 wt %.

Embodiment 18: The SCR catalyst composition of any one of embodiments 15-17, wherein the promoter metal is copper.

Embodiment 19: An SCR catalyst article effective to abate nitrogen oxides ($NO_x$) from a lean burn engine exhaust gas, the SCR catalyst article comprising a substrate having the selective catalytic reduction (SCR) catalyst composition according to any one of embodiments 15-18 disposed on at least a portion thereof.

Embodiment 20: The SCR catalyst article of embodiment 19, wherein the substrate is a honeycomb substrate.

Embodiment 21: The SCR catalyst article of embodiment 19, wherein the honeycomb substrate is a flow-through substrate or a wall-flow filter.

Embodiment 22: The SCR catalyst article of any one of embodiments 19-21, wherein at least a portion of the $NO_x$ in the exhaust gas stream is reduced to $N_2$ at a temperature between about 200° C. and about 600° C.

Embodiment 23: The SCR catalyst article of embodiment 22, wherein the $NO_x$ level in the exhaust gas stream is reduced by at least 50% at 200° C.

Embodiment 24: The SCR catalyst article of embodiment 22 or 23, wherein the $NO_x$ level in the exhaust gas stream is reduced by at least 70% at 600° C.

Embodiment 25: The SCR catalyst article of any one of embodiments 19-24, wherein the SCR catalyst article, after a thermal aging treatment conducted at 800° C. for 16 hours in the presence of 10 vol % steam and the balance air, exhibits an abatement of the $NO_x$ in the exhaust gas stream of about 72% or greater at 200° C., about 81% or greater at 600° C., or both, when the SCR catalyst article is tested under the following conditions: the SCR catalyst composition is disposed on a cellular ceramic monolith having a cell density of 400 cpsi and a wall thickness of 6 mil at a catalyst loading of 2.1 g/in³, at an exhaust gas hourly volume-based space velocity of 80,000 $h^{-1}$ under pseudo-steady state conditions, the exhaust gas comprising a gas mixture of 500 ppm NO, 500 ppm $NH_3$, 10% $O_2$, 5% $H_2O$, and the balance $N_2$.

Embodiment 26: An exhaust gas treatment system comprising the SCR catalyst article according to any one of embodiments 19 to 25, positioned downstream from and in fluid communication with a lean burn engine that produces an exhaust gas stream.

Embodiment 27: The exhaust gas treatment system of embodiment 26, further comprising one or more of the following: a diesel oxidation catalyst (DOC) positioned upstream of the SCR catalyst article; a soot filter positioned upstream of the SCR catalyst article; an ammonia oxidation catalyst (AMOx) positioned downstream of the SCR catalyst article.

Embodiment 28: A method of treating an exhaust gas stream from a lean burn engine, the method comprising contacting the exhaust gas stream with the catalyst article of any one of embodiments 19 to 25, or the exhaust gas treatment system of embodiment 26 or 27, for a time and at a temperature sufficient to reduce the level of nitrogen oxides ($NO_x$) in the exhaust gas stream.

Embodiment 29: The method of embodiment 28, wherein the $NO_x$ level in the exhaust gas stream is reduced to $N_2$ at a temperature between about 200° C. and about 600° C.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, in which reference numerals refer to components of exemplary embodiments of the invention. The drawings are exemplary only, and should not be construed as limiting the invention. The disclosure described herein is illustrated by way of example and not by way of limitation in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

DETAILED DESCRIPTION

Figure 1:
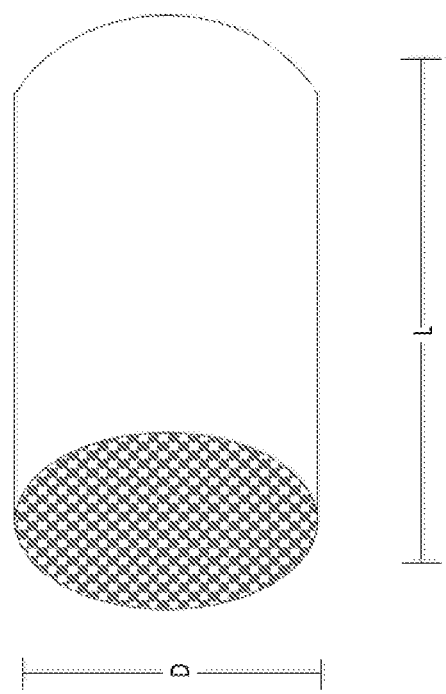
FIG. 1 is a perspective view of a wall-flow filter substrate.

The present disclosure generally provides zeolitic materials characterized by specific domain size and crystallographic strain values. These zeolitic materials may be useful as advanced selective catalytic reduction (SCR) catalyst compositions and articles with enhanced $NO_x$ conversion, especially at low temperatures, relative to standard Cu-chabazite reference SCR catalyst compositions and articles. Further provided are methods of preparation of the disclosed zeolitic materials, as well as SCR catalyst compositions, catalytic articles, exhaust treatment systems, and methods of treating exhaust streams, each comprising the disclosed zeolitic materials.

Before describing several exemplary embodiments, it is to be understood that the invention is not limited to the details of construction or process steps set forth in the following description. The invention is capable of other embodiments and of being practiced or being carried out in various ways.

Definitions

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example, "about 5.0" includes 5.0. Recitation of ranges of values herein are merely intended to serve as a shorthand method of referring individually to each separate value falling within the range, unless otherwise indicated herein, and each separate value is incorporated into the specification as if it were individually recited herein.

The term "abatement" means a decrease in the amount, caused by any means.

"AMOx" refers to a selective ammonia oxidation catalyst, which is a catalyst containing one or more metals (typically Pt, although not limited thereto) and an SCR catalyst suitable to convert ammonia to nitrogen.

The term "associated" means for instance "equipped with", "connected to" or in "communication with", for example "electrically connected" or in "fluid communication with" or otherwise connected in a way to perform a function. The term "associated" may mean directly associated with or indirectly associated with, for instance through one or more other articles or elements.

"Average particle size" is synonymous with $D_{50}$, meaning half of the population of particles has a particle size above this point, and half below. Particle size refers to primary particles. Particle size may be measured by laser light scattering techniques, with dispersions or dry powders, for example according to ASTM method D4464. $D_{90}$ particle size distribution indicates that 90% of the particles (by number) have a Feret diameter below a certain size as measured by Scanning Electron Microscopy (SEM) or Transmission Electron Microscopy (TEM) for submicron size particles; and a particle size analyzer for the support-containing particles (micron size).

As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

The term "catalyst" refers to a material that promotes a chemical reaction. The catalytically active species are also termed "promoters" as they promote chemical reactions.

The term "catalytic article" or "catalyst article" refers to a component that is used to promote a desired reaction. The present catalytic articles comprise a "substrate" having at least one catalytic coating disposed thereon.

"Crystal size" as used herein means the length of one edge of a face of the crystal, preferably the longest edge, provided that the crystals are not needle-shaped. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest dimensions of the individual crystals parallel to the horizontal line of the straight edge are measured and recorded. Particles that are clearly large polycrystalline aggregates are not to be included in the measurements. Based on these measurements, the arithmetic mean of the sample crystal sizes is calculated.

As used herein, "crystallite size" refers to the size of a discrete diffracting domain that coherently scatters X-rays. As used herein, "crystallite size" is used synonymously with "domain size." Actual crystal sizes, as defined above, determined by Scanning electron microscopy (SEM) imaging, are much larger than the domain size (e.g., much greater than 1000 to 2000 Å). Estimation of crystallite size may be performed from analysis of powder XRD using the Scherrer equation (Eq. 1), which relates the width of a powder diffraction peak to the average (by volume) dimensions of crystallites in a polycrystalline powder:

$$\beta_s(2\theta)_{hkl} = K\lambda/T \cos \theta_{hkl} \quad \text{(Eq. 1)},$$

where $\beta_s$ is the crystallite size contribution to the peak width (integral or full width at half maximum) in radians, K is a constant near unity, and T is the average thickness of the crystal in a direction normal to the diffracting plane hkl. Determination of crystallite size for certain zeolite materials is described in, for example, Burton et al., *Microporous and Mesoporous Materials* 117(2009), 75-90, the disclosure of which is incorporated by reference herein in its entirety.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, a CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. A CSF, when positioned behind a LNT catalyst, can have a $H_2S$ oxidation functionality to suppress $H_2S$ emission during the LNT desulfation process. An SCR catalyst composition can also be coated directly onto a wall-flow filter, which is referred to as SCRoF.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; zeolites for HC storage; and optionally promoters and/or stabilizers.

In general, the term "effective" means for example from about 35% to 100% effective, for instance from about 40%, about 45%, about 50% or about 55% to about 60%, about 65%, about 70%, about 75%, about 80%, about 85%, about 90% or about 95%, regarding the defined catalytic activity or storage/release activity, by weight or by moles.

The term "exhaust stream" or "exhaust gas stream" refers to any combination of flowing gas that may contain solid or liquid particulate matter. The stream comprises gaseous components and is for example exhaust of a lean burn engine, which may contain certain non-gaseous components such as liquid droplets, solid particulates and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases.

As used herein, "impregnated" or "impregnation" refers to permeation of the catalytic material into the porous structure of the support material.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

"LNT" refers to a lean $NO_x$ trap, which is a catalyst containing a platinum group metal, cerin, and an alkaline earth trap material suitable to adsorb $NO_x$ during lean conditions (for example, BaO or MgO). Under rich conditions, $NO_x$ is released and reduced to nitrogen.

As used herein, the phrase "molecular sieve" refers to framework materials such as zeolites and other framework materials (e.g. isomorphously substituted materials), which may in particulate form, and in combination with one or more promoter metals, be used as catalysts. Molecular sieves are materials based on an extensive three-dimensional network of oxygen ions containing generally tetrahedral type sites and having a substantially uniform pore distribution, with the average pore size being no larger than 20 Ångstroms (Å).

Molecular sieves can be differentiated mainly according to the geometry of the voids which are formed by the rigid network of the ($SiO_4$)/$AlO_4$ tetrahedra. The entrances to the voids are formed from 6, 8, 10, or 12 ring atoms with respect to the atoms which form the entrance opening. Molecular sieves are crystalline materials having rather uniform pore sizes which, depending upon the type of molecular sieves and the type and amount of cations included in the molecular sieves lattice, range from about 3 to 10 Å in diameter.

As used herein, the term "zeolite" refers to a specific example of a molecular sieve. Generally, a zeolite is defined as an aluminosilicate with an open 3-dimensional framework structure composed of corner-sharing $TO_4$ tetrahedra, where T is Al or Si, or optionally P. Aluminosilicate zeolite structures do not include phosphorus or other metals isomorphically substituted in the framework. That is, "aluminosilicate zeolite" excludes aluminophosphate materials such as SAPO, AlPO and MeAlPO materials, while the broader term "zeolite" includes aluminosilicates and aluminophosphates. For the purposes of this disclosure, SAPO, AlPO and MeAlPO materials are considered non-zeolitic molecular sieves. A zeolite may comprise $SiO_4$/$AlO_4$ tetrahedra that are linked by common oxygen atoms to form a three-dimensional network. Cations that balance the charge of the anionic framework are loosely associated with the framework oxygens, and the remaining pore volume is filled with water molecules. The non-framework cations are generally exchangeable, and the water molecules removable. A wide variety of cations can occupy these pores and can move through these channels.

The term "NOx" refers to nitrogen oxide compounds, such as NO, $NO_2$ or $N_2O$.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the term "promoted" refers to a component that is intentionally added to, e.g., a zeolitic material, typically through ion exchange, as opposed to impurities inherent in the zeolite. A zeolite may, for example, be promoted with copper (Cu) and/or iron (Fe), although other catalytic metals could be used, such as manganese, cobalt, nickel, cerium, platinum, palladium, rhodium or combinations thereof.

The term "promoter metal(s)" in the contest of zeolite SCR catalysts refers to one or more metals added to an ion-exchanged zeolite to generate a modified "metal-promoted" molecular sieve. The promoter metal is added to the ion-exchanged zeolite to enhance the catalytic activity of the active metal residing at the exchange site in the zeolite compared to ion-exchanged zeolites that do not contain a promoter metal, e.g., the addition of aluminum or alumina oxide as a "promoter metal" to a copper ion-exchanged zeolite enhances the catalytic activity of copper by preventing and/or reducing the formation of catalytically less active copper oxide clusters.

A promoter metal can be exchanged into the zeolite by a liquid phase exchange process, where the soluble metal ions exchange with the proton or ammonium or sodium ions associated with the zeolite. The exchange can also be carried out by a solid-state process, where promoter metal oxide or metal salt solid particles are mixed with a zeolite powder and processed under certain temperature and gas environments that may or may not contain steam. The exchange process can also be accomplished via an in-situ process during slurry preparation, where fine metal oxide particles are suspended in a zeolite slurry under conditions suitable for solid-liquid interaction.

As used herein, the term "selective catalytic reduction" (SCR) refers to the catalytic process of reducing oxides of nitrogen to dinitrogen ($N_2$) using a nitrogenous reductant.

"SCRoF" refers to an SCR catalyst composition coated directly onto a wall-flow filter.

The term "strain" as used herein refers to distortions in the lattice of crystalline materials which result in measurable diffraction peak broadening. Such distortions may arise from compressive and tensile forces which produce a distribution of d-spacings about the normally observed d-spacing of the material. The compressive and tensile forces may be the result of mechanical forces or dislocations in the crystals, crystal twinning, compositional gradients due to heteroatom substitution, varying densities of silanol/siloxy defects, or varying pore filling by organic or inorganic SDA cations.

Twinning in crystals creates stress gradients with concomitant strain gradients. Broadening of diffraction peak width is related to both stress and domain size, and is related to strain by Equation 2:

$$\beta_\varepsilon(2\theta) = 4\varepsilon \tan\theta \quad \text{(Eq. 2)},$$

where ε represents the residual strain and $\beta_\varepsilon$ is the stress-induced peak broadening. Calculated strain may be reported as a fraction or percentage that indicates the degree of variation in d-spacing within the sample. Approximation of both domain size and strain for certain zeolite materials by analysis of a Williamson-Hall plot is described in, for example, Burton et al., *Microporous and Mesoporous Materials* 117(2009), 75-90, the disclosure of which is incorporated by reference herein in its entirety.

"Substantially free" means "little or no" or "no intentionally added" and also having only trace and/or inadvertent amounts. For instance, in certain embodiments, "substantially free" means less than 2 wt % (weight %), less than 1.5 wt %, less than 1.0 wt %, less than 0.5 wt %, 0.25 wt % or less than 0.01 wt %, based on the weight of the indicated total composition.

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. Reference to "monolithic substrate" means a unitary structure that is homogeneous and continuous from inlet to outlet.

As used herein, the term "support" or "support material" refers to any material, typically a high surface area material, usually a refractory metal oxide material, upon which a metal is applied (e.g., PGMs, stabilizers, promoters, binders, and the like) through precipitation, association, dispersion, impregnation, or other suitable methods. Exemplary supports include porous refractory metal oxide supports as described herein below. The term "supported" means "dispersed on", "incorporated into", "impregnated into", "on", "in", "deposited on" or otherwise associated with.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

"Washcoat" has its usual meaning in the art of a thin, adherent coating of a material (e.g., a catalyst) applied to a "substrate", such as a honeycomb flow-through monolith substrate or a filter substrate which is sufficiently porous to permit the passage therethrough of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A washcoat is formed by preparing a slurry containing a specified solids content (e.g., 10-50% by weight) of catalyst in a liquid, which is then coated onto a substrate and dried to provide a washcoat layer. A substrate can contain one or more washcoat layers, and each washcoat layer can be different in some way (e.g., may differ in physical properties thereof such as, for example particle size or crystallite phase) and/or may differ in the chemical catalytic functions.

Unless otherwise indicated, all parts and percentages are by weight. "Weight percent (wt %)," if not otherwise indicated, is based on an entire composition free of any volatiles, that is, based on dry solids content.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods. All U.S. patent applications, published patent applications and patents referred to herein are hereby incorporated by reference.

Zeolitic Material and Properties

In one or more embodiments, the zeolite material as disclosed herein comprises an 8-ring small pore aluminosilicate zeolite. As used herein, "small pore" refers to pore openings which are smaller than about 5 Å, for example on the order of ~3.8 Å. The phrase "8-ring" zeolites refers to zeolites having 8-ring pore openings and double-six ring secondary building units and having a cage-like structure resulting from the connection of double six-ring building units by 4 rings. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the zeolite material as disclosed herein is a small-pore zeolite having a maximum ring size of eight tetrahedral atoms. In other embodiments, the small-pore molecular sieve comprises a d6r unit. Thus, in one or more embodiments, the small-pore zeolite has a structure type selected from AEI, AFT, AFX, CHA, EAB, ERI, KFI, LEV, LTN, MSO, SAS, SAT, SAV, SFW, TSC, and combinations thereof. In some embodiments, the small-pore zeolite material has a structure type selected from the group consisting of CHA, AEI, AFX, ERI, KFI, LEV, and combinations thereof. In some embodiments, the small-pore zeolite material has a structure type selected from CHA, AEI, and AFX. In one embodiment, zeolite material has the chabazite (CHA) structure type. In one or more embodiments, the zeolite material as disclosed herein has the CHA crystal structure and is selected from an aluminosilicate zeolite, a borosilicate, a gallosilicate, a SAPO, and ALPO, a MeAPSO, and a MeAPO. In some embodiments, the zeolite material having the CHA crystal structure is an aluminosilicate zeolite. Specific, non-limiting examples of zeolites having the CHA structure that are useful in the present disclosure include, but are not limited to, SSZ-13, SSZ-62, natural chabazite, zeolite K-G, Linde D, Linde R, LZ-218, LZ-235, LZ-236, ZK-14, SAPO-34, SAPO-44, SAPO-47, CuSAPO-34, CuSAPO-44, CuSAPO-47, and ZYT-6. In one embodiment, the zeolite material is chabazite (CHA).

The zeolite material as disclosed herein is typically present in the form of a highly crystalline material. In some embodiments, the zeolite material is least about 75% crystalline, at least about 80% crystalline, at least about 85% crystalline, at least about 90% crystalline, at least about 95% crystalline, at least about 98% crystalline, at least about 99% crystalline, or at least about 99.5% crystalline.

The zeolite material as disclosed herein is characterized by a relatively low mesopore surface area (MSA) combined with a zeolite surface area (ZSA) that provides good catalytic performance. In some embodiments, the MSA of the zeolite material is less than about 25 m²/g or less than about 15 m²/g (e.g., about 5 to about 25 m²/g). The ZSA of the zeolite material is typically at least about 400 m²/g, or at least about 450 m²/g, or at least about 500 m²/g, with an example ZSA range of about 400 to about 600 m²/g or about 450 to about 600 m²/g. Pore volume and surface area characteristics can be determined by nitrogen adsorption (BET surface area method).

The zeolite material as disclosed herein typically has an average crystal size of up to about 3 μm, or ranging from about 200 nm to about 3 μm, or from about 500 nm to about 2 μm, or from about 800 nm to about 1.5 μm. Average crystal sizes can be measured, for example, using microscopy, e.g., scanning electron microscopy (SEM).

The ratio of silica-to-alumina (SAR) of a present zeolite material can vary over a range. In some embodiments, the zeolite material can be characterized by an SAR range of from about 10 to about 45, for example, from about 10 to about 30, from about 15 to about 25, or from about 15 to about 20. In some embodiments, the SAR range is from about 15, about 16, or about 17, to about 18, about 19, or about 20.

As described above, in one aspect, the zeolite material is characterized by a domain size of less than about 1500 Å, a crystallographic strain of less than about 0.7%, or both. Surprisingly, it has been found according to the present disclosure that domain and/or strain values in these ranges, associated with a CHA framework type zeolite prepared as disclosed herein, when ion exchanged with copper, resulted in an SCR catalytic material having excellent $NO_x$ reduction performance. In some embodiments, the domain size is less than about 1400 Å, less than about 1300 Å, less than about 1200 Å, less than about 1100 Å, less than about 1000 Å, less than about 900 Å, or less than about 800 Å. In some embodiments, the domain size is from about 800 to about 1500 Å, for example, from about 800 Å, about 900 Å, about 1000 Å, or to about 1100 Å, to about 1200 Å, about 1300 Å, about 1400 Å, or about 1500 Å. In some embodiments, the domain size is from about 800 to about 1400 Å. In some embodiments, the domain size is from about 800 to about 1200 Å. In some embodiments, the domain size is from about 800 to about 1100 Å. In some embodiments, the domain size is from about 900 to about 1000 Å, from about 1000 to about 1100 Å, from about 1100 to about 1200 Å, from about 1200 to about 1300 Å, or from about 1300 to about 1400 Å.

In some embodiments, the crystallographic strain is less than about 0.7%, for example, less than about 0.6%, less than about 0.5%, less than about 0.4%, or less than about 0.3%. In some embodiments, the crystallographic strain is from about 0.2% to about 0.7%, for example, from about 0.2%, about 0.3%, or about 0.4%, to about 0.5%, or about 0.6%, or about 0.7%.

In some embodiments, the domain size is from about 1300 Å to about 1500 Å, and the crystallographic strain value is about 0.4% or less, for example, from about 0.2% to about 0.4%. In some embodiments, the domain size is from about 1100 Å to about 1200 Å, and the crystallographic strain value is about 0.6% or less, for example, from about 0.2% to about 0.6%. In specific embodiments, the domain size is from about 900 to about 1000 Å, and the crystallographic strain value is about 0.7% or less, for example, from about 0.2% to about 0.7%. In some embodiments, the domain size is from about 800 Å to about 1200 Å, and the crystallographic strain value is from about 0.2% to about 0.6%. In some embodiments, the domain size is from about 800 Å to about 1100 Å, and the crystallographic strain value is from about 0.3% to about 0.5%.

Method of Preparing Zeolitic Material

Synthesis of zeolitic materials varies according to the specific structure type, but typically involves the combination of several components (e.g. silica, alumina, phosphorous, alkali, structure directing agent (SDA), etc.) to form a synthesis gel, which is then hydrothermally crystallized to form a final product. During crystallization, the tetrahedral units organize around the SDA to form the desired framework, and the SDA is often embedded within the pore structure of the zeolite crystals. In one or more embodiments, the crystallization of the molecular sieve materials can be obtained by means of the addition of structure-directing agents/templates, crystal nuclei or elements The method of preparing zeolitic materials as disclosed herein generally comprises forming a reaction mixture comprising at least one alumina source that includes a zeolite (typically a zeolite having an FAU crystalline framework), at least one silica source (such as a source that includes an alkali metal silicate solution and/or colloidal silica), at least one organic structure directing agent (OSDA), and, optionally, a secondary alkali metal cation source to boost alkali metal content of the reaction mixture. The reaction mixture is typically provided under alkaline aqueous conditions. Each component of the reaction mixture (also referred to herein as a "synthesis gel") is further described below.

Alumina Source

The at least one alumina source generally includes a zeolite. The zeolite used as the alumina source can vary, and will include various zeolite materials known in the art, particularly various aluminosilicate zeolites. In certain embodiments, zeolites having the FAU crystalline structure are used, which are formed by 12-ring structures and have channels of about 7.4 Å. Examples of such zeolites include faujasite, zeolite X, zeolite Y, LZ-210, and SAPO-37. Such zeolites are characterized by a 3-dimensional pore structure with pores running perpendicular to each other in the x, y, and z planes, with secondary building units 4, 6, and 6-6. An example silica-to-alumina ratio (SAR) range for the bulk FAU zeolite material is about 3 to about 6, typically with a unit cell size range of 24.35 to 24.65, as determined by XRD. Zeolite Y is particularly useful in certain embodiments. The FAU zeolite is typically used in alkali metal form, such as the $Na^+$ form. In one particular embodiment, the FAU zeolite is in the sodium form and comprises from about 2.5% to 13% $Na_2O$ by weight.

Silica Source

The at least one silica source is typically an alkali metal silicate solution, for example, sodium silicate. The alkali metal silicate solution used in the reaction mixture can provide all of the alkali metal content needed to achieve the desired alkali metal to Si, Al, and OSDA ratios. However, alkali metal content of the reaction mixture may optionally be supplemented with a secondary alkali metal cation source, with examples including alkali metal sulfate (e.g., $Na_2SO_4$), alkali metal acetate (e.g., sodium acetate), and alkali metal bromide (e.g., sodium bromide). If desired, in certain embodiments, the alkali metal silicate solution can be supplemented or replaced with other silica sources, such as colloidal silica, fumed silica, tetraethyl orthosilicate (TEOS), and combinations thereof.

The molar ratio of alkali metal to silicon (M/Si, where M is moles of alkali metal) in the synthesis gel may vary. In certain embodiments, M/Si is at least about 0.4, or at least about 0.5, or at least about 0.6, or at least about 0.7, or at least about 0.8, with example ranges of about 0.4 to about 1.2, or about 0.6 to about 1.0, or about 0.7 to about 0.9. The alkali metal can be, for example, lithium, sodium, potassium, rubidium, or cesium. In certain embodiments, the alkali metal is sodium or potassium. In certain embodiments, the alkali metal is sodium.

The molar ratio of hydroxide ion to silicon ($OH^-/Si$, where $OH^-/Si$ is moles of hydroxide ion) in the synthesis gel may vary. In some embodiments, the $OH^-/Si$ molar ratio is less than about 0.7, or less than about 0.65, or less than about 0.6, or less than about 0.55, with example ranges of about 0.3 to about 0.7 or about 0.4 to about 0.65. Hydroxide ions are the only necessary mineralizing agent needed in the reaction mixture, and the amount of hydroxide needed to achieve the ratios noted above can be provided solely from the alkali metal silicate solution, and to a lesser extent, from the organic structure directing agent source. If desired, hydroxide ion content can be supplemented with additional hydroxide ion sources such as NaOH or KOH.

In certain embodiments, the combined molar ratio of alkali metal to Si (M/Si, where M is moles of alkali metal) and molar ratio of organic structure directing agent to Si (R/Si, where R is moles of organic structure directing agent) is greater than the molar ratio of hydroxide ions to Si ($OH^-/Si$). In other words, the combined molar ratio of M/Si+R/Si is greater than the molar ratio $OH^-/Si$.

In certain embodiments, the combined M/Si+R/Si ratio is greater than about 0.75, or greater than about 0.80, or greater than about 0.82 or greater than about 0.85, with example ranges of about 0.75 to about 0.95, or about 0.80 to about 0.95, or about 0.85 to about 0.95.

The molar ratio of silica-to-alumina (SAR) in the synthesis gel may vary. In some embodiments, the SAR range is typically about 25 to about 40, for example, from about 25 to about 35.

The molar ratio of water to Si ($H_2O/Si$) in the synthesis gel may vary. In some embodiments, the $H_2O/Si$ molar ratio is in the range of about 12 to about 40.

Organic Structure Directing Agent

The organic structure directing agent (OSDA) present in the synthesis gel is typically an amine and/or a quaternary ammonium salt. Examples include quaternary ammonium cations with substituents selected from the group consisting of alkyl, adamantyl, cyclohexyl, aromatic, and combinations thereof. Non-limiting examples of OSDAs include hydroxides of adamantyl trimethylammonium, cyclohexyl trimethylammonium, benzyl trimethylammonium, and dimethylpiperidinium. In some embodiments, the OSDA is adamantyl trimethylammonium hydroxide (TMAdaOH).

The quantity of the OSDA present may vary, and may be expressed by ratio to other components present (e.g., silica). In certain embodiments, the OSDA/Si molar ratio is less than about 0.12, or less than about 0.11, or less than about 0.10, or less than about 0.08, or less than about 0.06, with example ranges of about 0.04 to about 0.12, or about 0.06 to about 0.10.

The reaction mixture can be characterized in terms of solids content, expressed as a weight percentage of silica ($SiO_2$) and alumina ($Al_2O_3$). The solids content can vary, with an example range being about 5 to about 25%, or about 8 to about 20%.

Generally, the synthesis of a zeolitic material as described herein is conducted by heating the reaction mixture as described above in a pressure vessel with stirring to yield the desired crystalline zeolitic product. Typical reaction temperatures are in the range of from about 100° C. to about 160° C., for example from about 120° C. to about 160° C., with corresponding autogenous pressure. Typical reaction times are between about 30 hours to about 3 days. Optionally, the product may be centrifuged. Organic additives may be used to help with the handling and isolation of the solid product. Spray-drying is an optional step in the processing of the product. The solid zeolite product may then be thermally treated or calcined in air or nitrogen. Typical calcination temperatures are from about 400° C. to about 850° C. (e.g., about 500° C. to about 700° C.) over a period of 1 to 10 hours. Following initial calcination, the zeolitic material is primarily in the alkali metal form (e.g., $Na^+$ form). Optionally, single or multiple ammonia ion exchanges can be used to yield the $NH_4^+$ form of the zeolite. The $NH_4^+$ ion exchange can be carried out according to various techniques known in the art, for example Bleken, et al., *Topics in Catalysis* 52, (2009), 218-228. Optionally, the $NH_4$-exchanged zeolite may be further calcined to form the $H^+$ form.

SCR Catalyst Composition

The present disclosure provides a selective catalytic reduction (SCR) catalyst composition effective to catalyze the reduction of $NO_x$ from a lean burn engine exhaust gas in the presence of a reductant, the catalyst composition comprising the zeolite material as disclosed herein, promoted with a metal. As used herein, "promoted" refers to a component that is intentionally added to the zeolitic material, as opposed to impurities inherent in the zeolitic material. Thus, a promoter is intentionally added to enhance activity of a catalyst compared to a catalyst that does not have promoter intentionally added. In some embodiments, the zeolitic material as disclosed herein (e.g., in the $H^+$ form) is ion-exchanged with a promoter metal to form the metal-promoted zeolite catalyst. Accordingly, in order to promote the SCR of oxides of nitrogen, in one or more embodiments, the zeolitic material in one or more embodiments may be ion-exchanged with one or more promoter metals such as copper (Cu), cobalt (Co), nickel (Ni), lanthanum (La), manganese (Mn), iron (Fe), vanadium (V), silver (Ag), and cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), and tungsten (W). In some embodiments, the zeolitic material is promoted with Cu, Fe, or a combination thereof. In some embodiments, the zeolitic material is promoted with Cu.

The promoter metal content of the zeolitic material, calculated as the oxide, is, in one or more embodiments, at least about 0.1 wt %, reported on a volatile-free basis. In one or more embodiments, the promoter metal is present in an amount in the range of about 1 to about 10% by weight, including the range of about 2 to about 5% by weight, and the range of about 4 to about 6% by weight, in all cases, based on the total weight of the zeolitic material. In one or more specific embodiments, the promoter metal comprises Cu, and the Cu content, calculated as CuO is in the range of up to about 10 wt %, including 9, 8, 7, 6, 5, 4, 3, 2, 1, 0.5, and 0.1 wt %, on an oxide basis, in each case based on the total weight of the calcined zeolitic material and reported on a volatile free basis. In specific embodiments, the Cu content, calculated as CuO, is in the range of about 2 to about 6 wt %.

SCR Catalytic Articles

In another aspect is provided a SCR catalyst article effective to abate nitrogen oxides ($NO_x$) from a lean burn engine exhaust gas, the SCR catalyst article comprising a substrate and a first washcoat comprising the SCR catalyst composition as disclosed herein, disposed on at least a portion of the substrate.

Substrate

In one or more embodiments, the present SCR catalyst composition is disposed on a substrate to form a SCR catalyst catalytic article. Catalytic articles comprising the substrates are generally employed as part of an exhaust gas treatment system (e.g., catalyst articles including, but not limited to, articles including the SCR catalyst composition disclosed herein). Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed catalyst(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punchouts" in the channel walls. The metallic substrates may be employed in various shapes such as pellets, compressed metallic fibers, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt % of aluminum, and from 0 to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

Any suitable substrate for the SCR catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. In some embodiments, the substrate is a flow-through substrate. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on or in which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 $in^3$ to about 1200 $in^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes. The wall-flow filter substrate can be ceramic or metallic as described above.

Figure 2:
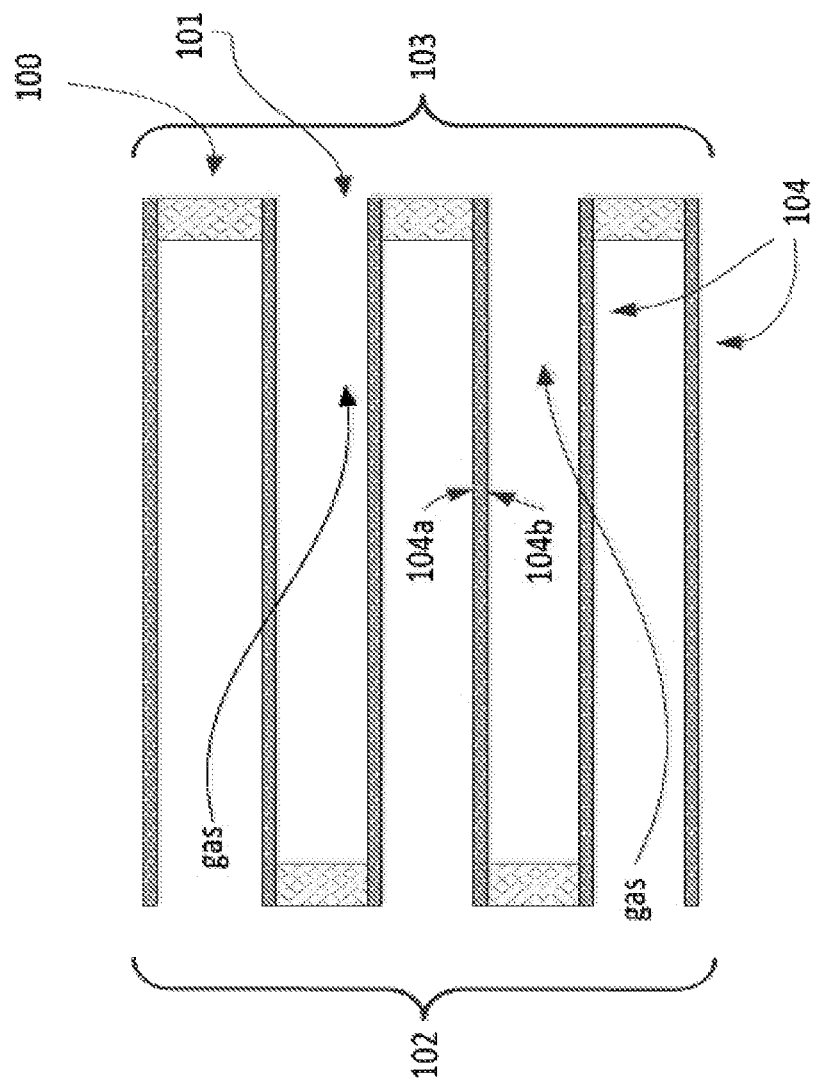
FIG. 2 is a cutaway view of a section enlarged relative to FIG. 1, wherein the honeycomb-type substrate in FIG. 1a represents a wall-flow filter.

Referring to FIG. 1, the exemplary wall-flow filter substrate has a cylindrical shape and a cylindrical outer surface having a diameter D and an axial length L. FIG. 2 is a perspective view of an exemplary wall-flow filter. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104*a* and outlet side 104*b*. The passages are enclosed by the cell walls.

The wall-flow filter article substrate may have a volume of, for instance, from about 50 $cm^3$, about 100 $in^3$, about 200 $in^3$, about 300 $in^3$, about 400 $in^3$, about 500 $in^3$, about 600 $in^3$, about 700 $in^3$, about 800 $in^3$, about 900 $in^3$ or about 1000 $in^3$ to about 1500 $in^3$, about 2000 $in^3$, about 2500 $in^3$, about 3000 $in^3$, about 3500 $in^3$, about 4000 $in^3$, about 4500 $in^3$ or about 5000 $in^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 40% or at least about 50% with an average pore diameter of at least about 10 microns prior to disposition of the functional coating. For instance, the wall-flow filter article substrate in some embodiments will have a porosity of >40%, >50%, >60%, >65% or >70%. For instance, the wall-flow filter article substrate will have a wall porosity of from about 50%, about 60%, about 65% or about 70% to about 75% and an average pore diameter of from about 10, or about 20, to about 30, or about 40 microns prior to disposition of a catalytic coating. The terms "wall porosity" and "substrate porosity" mean the same thing and are interchangeable. Porosity is the ratio of void volume (or pore volume) divided by the total volume of a substrate material. Pore size and pore size distribution are typically determined by Hg porosimetry measurement.

Substrate Coating Process

To produce SCR catalytic articles of the present disclosure, a substrate as described herein is contacted with an SCR catalyst composition as disclosed herein to provide a coating (i.e., a slurry comprising particles of the metal-promoted zeolitic material are disposed on a substrate). The coatings are "catalytic coating compositions" or "catalytic coatings." A "catalyst composition" and a "catalytic coating composition" are synonymous.

In addition to the metal-promoted zeolitic material, the coating slurry may optionally contain a binder in the form of alumina, silica, Zr acetate, colloidal zirconia, or Zr hydroxide, associative thickeners, and/or surfactants (including anionic, cationic, non-ionic or amphoteric surfactants). Other exemplary binders include bohemite, gamma-alumina, or delta/theta alumina, as well as silica sol. When present, the binder is typically used in an amount of about 1-5 wt % of the total washcoat loading. Addition of acidic or basic species to the slurry can be carried out to adjust the pH accordingly. For example, in some embodiments, the pH of the slurry is adjusted by the addition of ammonium hydroxide or aqueous nitric acid. A typical pH range for the slurry is about 3 to 6.

The slurry can be milled to reduce the particle size and enhance particle mixing. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a $D_{90}$ particle size of about 10 to about 40 microns, preferably 10 to about 30 microns, more preferably about 10 to about 15 microns. The $D_{90}$ is determined using a dedicated particle size analyzer. The equipment was manufactured by Sympatec in 2010 and uses laser diffraction to measure particle sizes in small volume slurry.

The present SCR catalyst composition may typically be applied in the form of one or more washcoats containing the SCR catalyst composition as disclosed herein. A washcoat is formed by preparing a slurry containing a specified solids content (e.g., about 10 to about 60% by weight) of catalyst in a liquid vehicle, which is then applied to a substrate using any washcoat technique known in the art and dried and calcined to provide a coating layer. If multiple coatings are applied, the substrate is dried and/or calcined after each washcoat is applied and/or after the number of desired multiple washcoats are applied. In one or more embodiments, the catalytic material(s) are applied to the substrate as a washcoat.

In some embodiments, the drying is performed at a temperature of from about 100 to about 150° C. In some embodiments, drying is performed in a gas atmosphere. In some embodiments, the gas atmosphere comprises oxygen. In some embodiments, the drying is performed for a duration of time in the range of from 10 minutes to 4 hours, more preferably in the range of from 20 minutes to 3 hours, more preferably from 50 minutes to 2.5 hours.

In some embodiments, the calcination is performed at a temperature of from about 300 to 900° C., from about 400 to about 650° C., or from about 450 to about 600° C. In some embodiments, the calcination is performed in a gas atmosphere. In some embodiments, the gas atmosphere comprises oxygen. In some embodiments, the calcination is performed for a duration of time in the range of from 10 minutes to about 8 hours, from about 20 minutes to about 3 hours, or from about 30 minutes to about 2.5 hours.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat layer (coating layer) can be repeated as needed to build the coating to the desired loading level or thickness, meaning more than one washcoat may be applied. In some embodiments, the catalyst washcoat loading is in the range of from about 0.8 to 2.6 g/in³, from about 1.2 to 2.2 g/in³, or from about 1.5 to about 2.2 g/in³.

The present SCR catalytic coating may comprise one or more coating layers, where at least one layer comprises the present SCR catalyst composition. The catalytic coating may comprise one or more thin, adherent coating layers disposed on and in adherence to least a portion of a substrate. The entire coating comprises the individual "coating layers."

Coating Configurations

In some embodiments, the present SCR catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a washcoat disposed on the substrate" means on any surface, for example on a wall surface and/or on a pore surface.

The washcoat(s) can be applied such that different coating layers may be in direct contact with the substrate. Alternatively, one or more "undercoats" may be present, so that at least a portion of a catalytic coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Alternatively, the present catalyst composition may be in a top coating layer over a bottom coating layer. The catalyst composition may be present in a top and a bottom layer. Any one layer may extend the entire axial length of the substrate, for instance a bottom layer may extend the entire axial length of the substrate and a top layer may also extend the entire axial length of the substrate over the bottom layer. Each of the top and bottom layers may extend from either the inlet or outlet end.

For example, both bottom and top coating layers may extend from the same substrate end where the top layer partially or completely overlays the bottom layer and where the bottom layer extends a partial or full length of the substrate and where the top layer extends a partial or full length of the substrate. Alternatively, a top layer may overlay a portion of a bottom layer. For example, a bottom layer may extend the entire length of the substrate and the top layer may extend about 10%, about 20%, about 30%, about 40%, about 50%, about 60%, about 70%, about 80% or about 90% of the substrate length, from either the inlet or outlet end.

Alternatively, a bottom layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end or outlet end and a top layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end of outlet end, wherein at least a portion of the top layer overlays the bottom layer. This "overlay" zone may for example extend from about 5% to about 80% of the substrate length, for example about 5%, about 10%, about 20%, about 30%, about 40%, about 50%, about 60% or about 70% of the substrate length.

In some embodiments, the SCR catalyst composition as disclosed herein, disposed on the substrate as disclosed herein, comprises a first washcoat disposed on at least a portion of the length of the catalyst substrate.

In some embodiments, the first washcoat is disposed directly on the catalyst substrate, and a second washcoat (either the same or comprising a different catalyst or catalyst component) is disposed on at least a portion of the first washcoat. In some embodiments, the second washcoat is disposed directly on the catalyst substrate, and the first washcoat is disposed on at least a portion of the second washcoat. In some embodiments, the first washcoat is disposed directly on the catalyst substrate from the inlet end to a length of from about 10% to about 50% of the overall length; and the second washcoat is disposed on at least a portion of the first washcoat. In some embodiments, the second washcoat is disposed directly on the catalyst substrate from the inlet end to a length of from about 50% to about 100% of the overall length; and the first washcoat is disposed on at least a portion of the second washcoat. In some embodiments, the first washcoat is disposed directly on the catalyst substrate from the inlet end to a length of from about 20% to about 40% of the overall length, and the second washcoat extends from the inlet end to the outlet end. In some embodiments, the first washcoat is disposed directly on the catalyst substrate from the outlet end to a length of from about 10% to about 50% of the overall length, and the second washcoat is disposed on at least a portion of the first washcoat. In some embodiments, the first washcoat is disposed directly on the catalyst substrate from the outlet end to a length from about 20 to about 40% of the overall length, and the second washcoat extends from the inlet end to the outlet end. In some embodiments, the second washcoat is disposed directly on the catalyst substrate from the outlet end to a length of from about 50% to about 100% of the overall length, and the first washcoat is disposed on at least a portion of the second washcoat. In some embodiments, the first washcoat is disposed directly on the catalyst substrate covering 100% of the overall length, and the second washcoat is disposed on the first washcoat covering 100% of the overall length. In some embodiments, the second washcoat is disposed directly on the catalyst substrate covering 100% of the overall length, and the first washcoat is disposed on the second washcoat covering 100% of the overall length.

The catalytic coating may advantageously be "zoned," comprising zoned catalytic layers, that is, where the catalytic coating contains varying compositions across the axial length of the substrate. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones.

For instance, the SCR article may comprise an upstream zone comprising the first washcoat layer; and a downstream zone comprising the second washcoat layer comprising a different catalyst material or component. Alternatively, an upstream zone may comprise the second washcoat layer and a downstream zone may comprise the first washcoat layer.

In some embodiments, the first washcoat is disposed on the catalyst substrate from the inlet end to a length of from about 10% to about 50% of the overall length; and the second washcoat is disposed on the catalyst substrate from the outlet end to a length of from about 50% to about 90% of the overall length. In some embodiments, the first washcoat is disposed on the catalyst substrate from the outlet end to a length of from about 10% to about 50% of the overall length; and wherein the second washcoat is disposed on the catalyst substrate from the inlet end to a length of from about 50% to about 90% of the overall length.

Figure 3A:
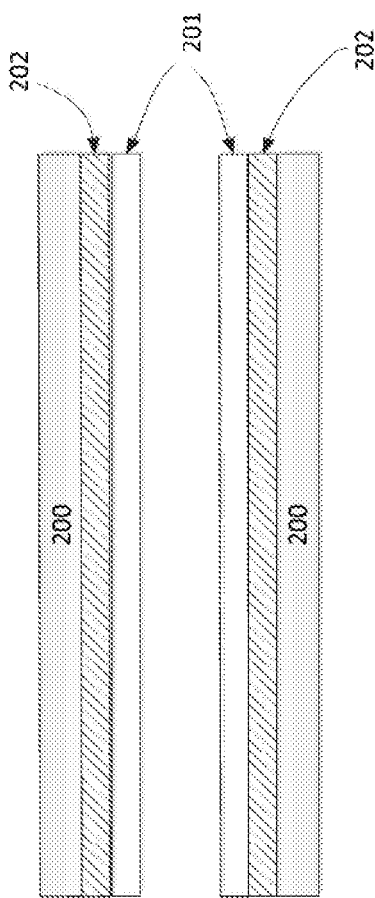
FIGS. 3a, 3b, and 3c are illustrations of three possible coating configurations according to certain embodiments.
Figure 3B:
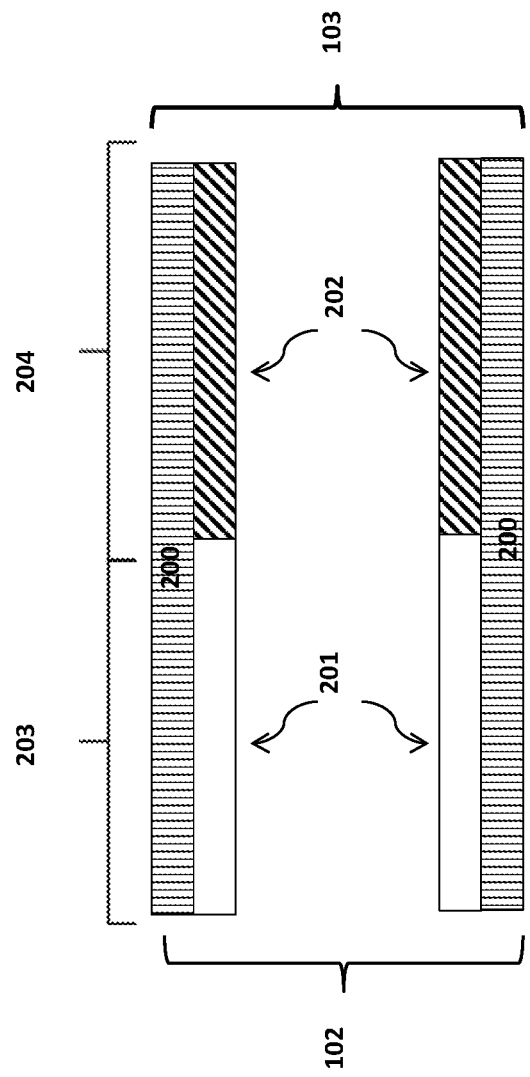
Figure 3C:
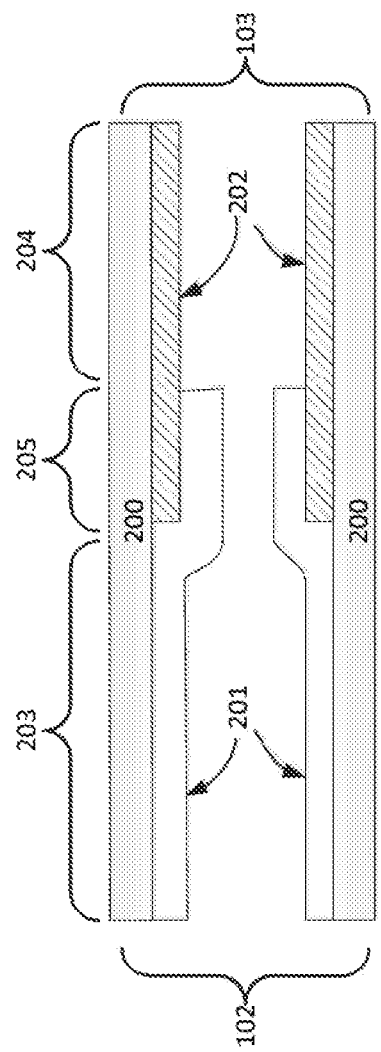

FIGS. 3a, 3b, and 3c show some possible coating layer configurations with two coating layers. Shown are substrate walls 200 onto which coating layers 201 (top coat) and 202 (bottom coat) are disposed. This is a simplified illustration, and in the case of a porous wall-flow substrate, not shown are pores and coatings in adherence to pore walls and not shown are plugged ends. In FIG. 3a, coating layers 201 and 202 each extend the entire length of the substrate with top layer 201 overlaying bottom layer 202. The substrate of FIG. 3a does not contain a zoned coating configuration. FIG. 3b is illustrative of a zoned configuration having a coating layer 202 which extends from the outlet about 50% of the substrate length to form a downstream zone 204, and a coating layer 201 which extends from the inlet about 50% of the substrate length, providing an upstream zone 203. In FIG. 3c, bottom coating layer 202 extends from the outlet about 50% of the substrate length and top coating layer 201 extends from the inlet greater than 50% of the length and overlays a portion of layer 202, providing an upstream zone 203, a middle overlay zone 205 and a downstream zone 204. FIGS. 3a, 3b, and 3c may be useful to illustrate SCR catalyst composition coatings on a wall-through substrate or a flow-through substrate.

In some embodiments, the substrate is a honeycomb substrate. In some embodiments, the honeycomb substrate is a flow-through substrate or a wall-flow filter. In certain embodiments, the metal-promoted zeolite material as disclosed herein, when incorporated into an SCR catalytic article as disclosed herein, can be characterized by SCR activity at various temperatures. For example, in some embodiments, at least a portion of the NOx in an exhaust gas stream is reduced to $N_2$ at a temperature between about 200° C. and about 600° C. In some embodiments, the NOx level in the exhaust gas stream is reduced by at least 50% at 200° C. In some embodiments, the NOx level in the exhaust gas stream is reduced by at least 70% at 600° C. In some embodiments, the SCR catalyst article, after a thermal aging treatment conducted at 800° C. for 16 hours in the presence of 10 vol % steam and the balance air, exhibits an abatement of the NOx in the exhaust gas stream of about 72% or greater at 200° C., about 81% or greater at 600° C., or both, when the SCR catalyst article is tested under the following conditions: the SCR catalyst composition is disposed on a cellular ceramic monolith having a cell density of 400 cpsi and a wall thickness of 6 mil at a catalyst loading of 2.1 $g/in^3$, at an exhaust gas hourly volume-based space velocity of 80,000 $h^{-1}$ under pseudo-steady state conditions, the exhaust gas comprising a gas mixture of 500 ppm NO, 500 ppm $NH_3$, 10% $O_2$, 5% $H_2O$, and the balance $N_2$.

Exhaust Gas Treatment System

In a further aspect is provided an exhaust gas treatment system comprising the SCR article as disclosed herein, located dowstream and in fluid communication with a lean burn engine that produces an exhaust gas stream. The engine can be, e.g., a diesel engine which operates at combustion conditions with air in excess of that required for stoichiometric combustion, i.e. lean conditions. In other embodiments, the engine can be an engine associated with a stationary source (e.g., electricity generators or pumping stations). In some embodiments, the emission treatment system further comprises one or more additional catalytic components. The relative placement of the various catalytic components present within the emission treatment system can vary.

In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

The systems disclosed herein comprise a SCR catalytic article as disclosed herein, and may further comprise one or more additional components. In some embodiments, the one or more additional components are selected from the group consisting of a diesel oxidation catalyst (DOC), a soot filter (which can be catalyzed or uncatalyzed), a urea injection component, an ammonia oxidation catalyst (AMOx), a low-temperature $NO_x$ absorber (LT-NA), a lean $NO_x$ trap (LNT), and combinations thereof. A system may contain, for instance, a selective catalytic reduction catalyst (SCR) as disclosed herein, a diesel oxidation catalyst (DOC) and one or more articles containing a reductant injector, a soot filter, an ammonia oxidation catalyst (AMOx) or a lean $NO_x$ trap (LNT). An article containing a reductant injector is a reduction article. A reduction system includes a reductant injector and/or a pump and/or a reservoir, etc. The present treatment system may further comprise a soot filter and/or an ammonia oxidation catalyst. A soot filter may be uncatalyzed or may be catalyzed (CSF). For instance, the present treatment system may comprise, from upstream to downstream, an article containing a DOC, a CSF, a urea injector, a SCR article and an article containing an AMOx. A lean $NO_x$ trap (LNT) may also be included.

The relative placement of the various catalytic components present within the emission treatment system can vary. In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

Figure 4:
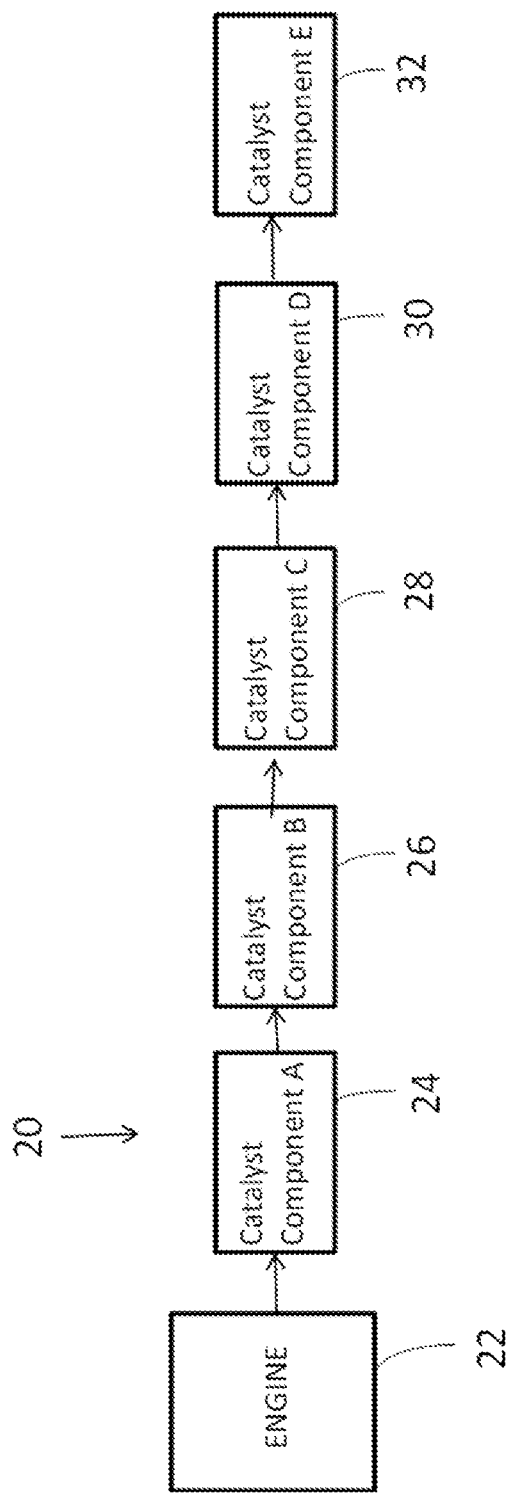
FIG. 4 shows a schematic depiction of an embodiment of an emission treatment system in which an SCR catalyst article of the present invention is utilized.

One exemplary emission treatment system is illustrated in FIG. 4, which depicts a schematic representation of an emission treatment system 20. As shown, the emission treatment system can include a plurality of catalyst components in series downstream of an engine 22, such as a lean burn gasoline engine. At least one of the catalyst components will be the SCR catalyst article as set forth herein. The SCR catalyst article could be combined with numerous additional catalyst materials and could be placed at various positions in comparison to the additional catalyst materials. FIG. 4 illustrates five catalyst components, 24, 26, 28, 30, 32 in series; however, the total number of catalyst components can vary and five components is merely one example. One of skill in the art will recognize that it may be desirable to arrange the relative position of each article in a different order than illustrated herein; such alternative ordering is contemplated by the present disclosure.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 4.

The LNT catalyst noted in Table 1 can be any catalyst conventionally used as a $NO_x$ trap, and typically comprises $NO_x$-adsorber compositions that include base metal oxides (BaO, MgO, $CeO_2$, and the like) and a platinum group metal for catalytic NO oxidation and reduction (e.g., Pt and Rh).

The LT-NA catalyst noted in Table 1 can be any catalyst that can adsorb $NO_x$ (e.g., NO or $NO_2$) at low temperatures (<250° C.) and release it to the gas stream at high temperatures (>250° C.). The released $NO_x$ is generally converted to $N_2$ and $H_2O$ over a down-stream SCR or SCRoF catalyst, such as disclosed herein. Typically, a LT-NA catalyst comprises Pd-promoted zeolites or Pd-promoted refractory metal oxides.

Reference to SCR in the table refers to an SCR catalyst, which may include the SCR catalyst composition of the disclosure. Reference to SCRoF (or SCR on filter) refers to a particulate or soot filter (e.g., a wall-flow filter), which can include the SCR catalyst composition of the disclosure.

Where both SCR and SCRoF are present, one or both can include the SCR catalyst of the present disclosure, or one of the catalysts could include a conventional SCR catalyst.

Reference to AMOx in the table refers to an ammonia oxidation catalyst, which can be provided downstream of the catalyst of one more embodiments of the invention to remove any slipped ammonia from the exhaust gas treatment system. In specific embodiments, the AMOx catalyst may comprise a PGM component. In one or more embodiments, the AMOx catalyst may comprise a bottom coat with PGM and a top coat with SCR functionality.

As recognized by one skilled in the art, in the configurations listed in Table 1, any one or more of components A, B, C, D, or E can be disposed on a particulate filter, such as a wall flow filter, or on a flow-through honeycomb substrate. In one or more embodiments, an engine exhaust system comprises one or more catalyst components mounted in a position near the engine (in a close-coupled position, CC), with additional catalyst components in a position underneath the vehicle body (in an underfloor position, UF). In one or more embodiments, the exhaust gas treatment system may further comprise a urea injection component.

from stationary industrial processes, removal of noxious or toxic substances from indoor air or for catalysis in chemical reaction processes.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided

TABLE 1

Possible exhaust gas treatment system configurations

| Component A | Component B | Component C | Component D | Component E |
|---|---|---|---|---|
| DOC | SCR | Optional AMOx | — | — |
| DOC | SCRoF | Optional AMOx | — | — |
| DOC | SCRoF | SCR | Optional AMOx | — |
| DOC | SCR | SCRoF | Optional AMOx | — |
| DOC | SCR | SCRoF | CSF | Optional AMOx |
| DOC | SCR | CSF | Optional AMOx | — |
| DOC | CSF | SCR | Optional AMOx | — |
| LNT | CSF | SCR | Optional AMOx | — |
| LNT | SCRoF | SCR | Optional AMOx | — |
| LT-NA | CSF | SCR | Optional AMOx | — |
| LT-NA | SCRoF | SCR | Optional AMOx | — |
| DOC | LNT | CSF | SCR | Optional AMOx |
| DOC | LNT | SCRoF | SCR | Optional AMOx |
| DOC | LT-NA | CSF | SCR | Optional AMOx |
| DOC | LT-NA | SCRoF | SCR | Optional AMOx |

Method of Treating Engine Exhaust

Another aspect of the present disclosure is directed to a method of treating the exhaust gas stream of a lean burn engine, particularly a lean burn gasoline engine or diesel engine. Generally, the method comprises contacting the exhaust gas stream with the catalytic article of the present disclosure, or the emission treatment system of the present disclosure. The method can include placing the SCR catalyst article according to one or more embodiments of the invention downstream from an engine and flowing the engine exhaust gas stream over the catalyst. In one or more embodiments, the method further comprises placing additional catalyst components downstream from the engine as noted above. In some embodiments, the method comprises contacting the exhaust gas stream with the catalytic article or the exhaust gas treatment system of the present disclosure, for a time and at a temperature sufficient to reduce the levels of one or more $NO_x$ components which may be present in the exhaust gas stream.

The present catalyst compositions, articles, systems, and methods are suitable for treatment of exhaust gas streams of internal combustion engines, for example gasoline, light-duty diesel and heavy duty diesel engines. The catalyst compositions are also suitable for treatment of emissions

EXAMPLES

Aspects of the present invention are more fully illustrated by the following examples, which are set forth to illustrate certain aspects of the present invention and are not to be construed as limiting thereof. Before describing several exemplary embodiments, it is to be understood that the invention is not limited to the details of construction or process steps set forth in the following description, and is capable of other embodiments and of being practiced or being carried out in various ways. Unless otherwise noted, all parts and percentages are by weight, and all weight percentages are expressed on a dry basis, meaning excluding water content, unless otherwise indicated.

Example 1. CHA Zeolite Syntheses

A series of CHA zeolites (Examples 1A-1D) were synthesized. For crystallization of the zeolites 1A-1D, an aluminosilicate synthesis gel with the following composition was prepared: $SiO_2/Al_2O_3=35$, Na/Si=0.81, $TMAda^+$/Si=0.09, OH/Si=0.50. The $H_2O$/Si ratio was 32 for Example 1A, 12 for Example 1B, and 34 for Examples 1C and 1D. Trimethyladamantylammonium hydroxide (TMAdaOH) was used as the organic structure directing agent (OSDA) for each preparation. Sodium silicate solution ($SiO_2/Na_2O=2.6$ (Examples 1A-1C) or $SiO_2/Na_2O=3.3$ (Example 1D)) and Na-FAU ($SiO_2/Al_2O_3=5.1$) were used as Si and Al sources, respectively. The gel $Na^+$ content was supplemented with $Na_2SO_4$ to reach the desired Na/Si ratio. CHA seeds (SAR=20; 5% of the total $SiO_2$ content) were added to the gel composition for Example 1C. Furthermore, the desired OH/Si ratio was obtained via neutralization of excess $OH^-$ with $H_2SO_4$. A 1:1 ratio between $Na^+$ and $OH^-$ was assumed for the sodium silicate solution to calculate $OH^-/SiO_2$ ratio. All crystallization were conducted in 2 L stirred autoclaves at 140° C. for 36 h (Example 1C) or 72 h (Examples 1A, 1B, and 1D) at autogenous pressure. The products were isolated by filtration, dried and calcined (540° C., 6 h) to yield the $Na^+$ form. The $SiO_2/Al_2O_3$ ratio for each product was between 17 and 20 (Table 2).

Example 2. Zeolite Properties

The products were characterized by XRD and $N_2$-Physisorption (Table 2). All crystallizations yielded products with >90% primary phase crystallinity, and correspondingly high micropore surface areas (>500 $m^2/g$). Mesopore and zeolitic (micropore) surface areas were determined via $N_2$-adsorption porosimetry on a Micromeritics TriStar 3000 series instrument, in accordance with ISO 9277 methods. The samples were degassed for a total of 6 hours (a 2 hour ramp up to 300° C. then held at 300° C. for 4 hours, under a flow of dry nitrogen) on a Micromeritics SmartPrep degasser. Nitrogen BET surface area was determined using 5 partial pressure points between 0.08 and 0.20. Zeolitic and matrix surface areas were determined using the same 5 partial pressure points and calculated using Harkins and Jura t-plot. Pores having diameter greater than 20 Å are considered to contribute to matrix surface area.

Crystallographic strain was measured using Rietveld refinement of the powder X-ray diffraction data. Specifically, strain was calculated from the LY parameter from a General Structure Analysis System (GSAS) Rietveld refinement of X-ray diffraction data. GSAS methods used were similar to those in International Patent Application Publication No. WO2018/201046, the disclosure of which is incorporated by reference herein with respect to such methods. GSAS software was written at Los Alamos National Laboratory, and is disclosed in A. C. Larson and R. B. Von Dreele, *General Structure Analysis System (GSAS)*, Los Alamos National Laboratory Report LAUR 86-748 (2004), which is incorporated by reference herein. For example, the GSAS manual provides for calculation of strain as determined from profile function 2 parameter LY as follows:

$$S=(\pi/18000)*(LY-LYi)100\%.$$

It was determined that in this particular instance, and for the diffractometer used in the analysis, LYi was zero. That is, the instrument used did not contribute to parameter LY.

Domain size was also estimated using GSAS methods. For domain size, the GSAS LX parameter was used. For example, the GSAS manual provides for calculation of domain size from parameter LX as follows:

$$p=18000K\lambda/\pi LX$$

where p is the domain size in Angstroms (Å).

TABLE 2

Zeolitic material properties.

| Composition/Example # | $SiO_2/Al_2O_3$ | ZSA ($m^2/g$) | MSA ($m^2/g$) | Strain (%) | Domain Size (Å) |
|---|---|---|---|---|---|
| 1A | 18.9 | 581 | 12 | 0.47 | 935 |
| 1B | 17 | 565 | 12 | 0.54 | 1414 |
| 1C | 18.9 | 560 | 19 | 0.60 | 970 |
| 1D | 19.8 | 574 | 14 | 1.46 | 2260 |

Example 3. SCR Catalyst Compositions

To prepare SCR catalysts from the aforementioned materials, Cu ions were ion exchanged into the $H^+$ form of CHA zeolites A-D to attain a CuO loading of 4.5-5.0 wt % and a zeolite SAR ~18-20. Catalytic coatings containing the Cu-CHA zeolite catalyst, zirconium oxide, and pseudoboehmite (PB-250) binder were disposed via a washcoat process on cellular ceramic monoliths having a cell density of 400 cpsi and a wall thickness of 6 mil. The coated monoliths were dried at 110° C. and calcined at about 550° C. for 1 hour. The coating process provided a catalyst loading of 2.1 $g/in^3$ of which 5% was zirconium oxide and 5% aluminum oxide binder. Prior to SCR testing, the coated monoliths were hydrothermally aged in the presence of 10% $H_2O$/air at 800° C. for 16 hours.

$NO_x$ conversions (Table 3) were measured in a laboratory reactor at a gas hourly volume-based space velocity of 80,000 $h^{-1}$ under pseudo-steady state conditions in a gas mixture of 500 ppm NO, 500 ppm $NH_3$, 10% $O_2$, 5% $H_2O$, balance $N_2$ in a temperature ramp of 0.5° C./min from 200° C. to 600° C. The data in Table 3 showed that higher levels of $NO_x$ conversion at both 200° C. and 600° C. were generally obtained with zeolite domain sizes smaller than about 1000 Å (Examples 1A and 1C). Actual crystal sizes determined by Scanning electron microscopy (SEM) imaging were much larger than 1000-2000 Å. Data in Table 3 further demonstrated that higher levels of $NO_x$ conversion at both 200° C. and 600° C. were obtained with a zeolite having a strain value of less than about 0.50% (Example 1A).

TABLE 3

Properties of SCR articles including the zeolitic materials

| Example # | $NO_x$ conversion (%) @ 200° C. | $NO_x$ conversion (%) @ 600° C. |
|---|---|---|
| 1A | 69 | 81 |
| 1B | 51 | 76 |
| 1C | 60 | 74 |
| 1D | 58 | 73 |

Figure 5:
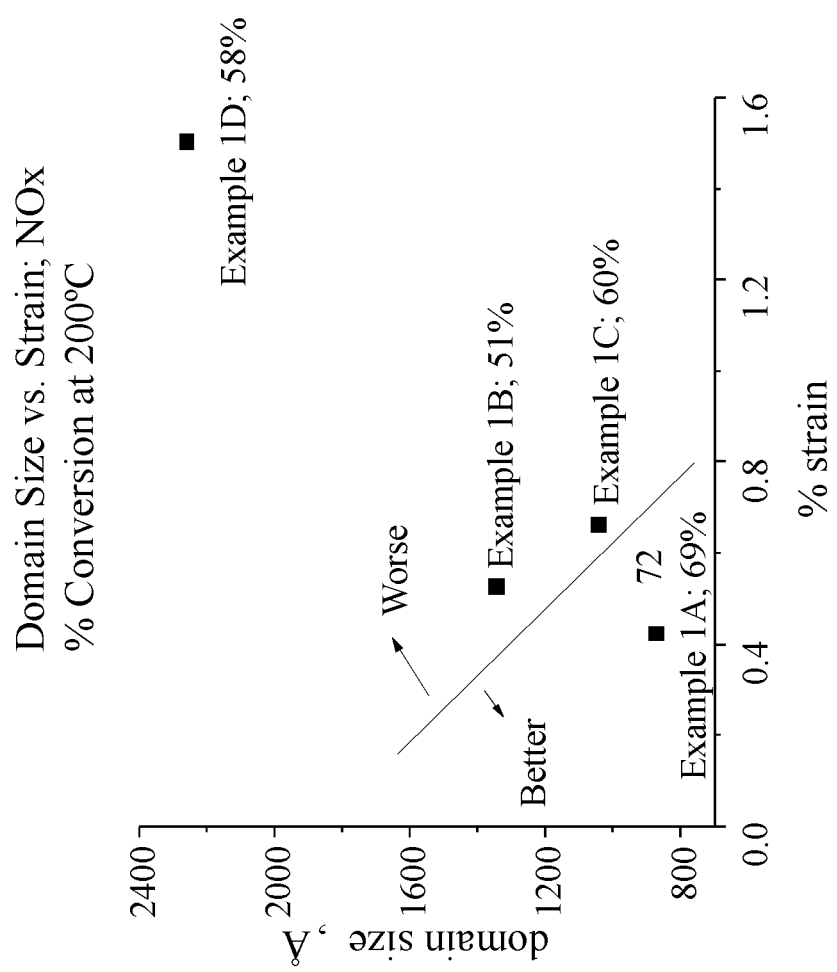
FIG. 5 is a plot of domain size vs. % strain and $NO_x$ reduction at 200° C. according to certain embodiments.
Figure 6:
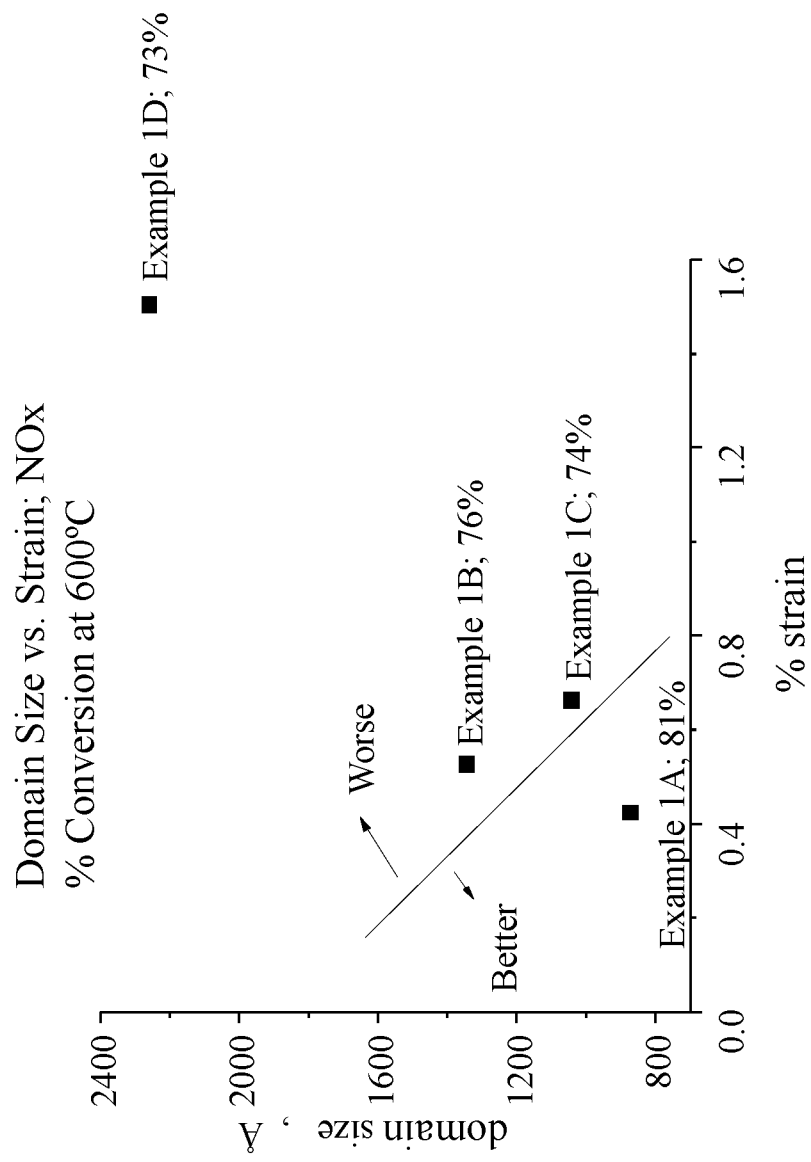
FIG. 6 is a plot of domain size vs. % strain and $NO_x$ reduction at 600° C. according to certain embodiments.

The relationship between domain size, strain, and $NO_x$ conversion performance at 200° C. and 600° C. are further depicted graphically in FIGS. 5 and 6, respectively, from which data in Table 3 was obtained. Without wishing to be bound by theory, it is believed that Cu-CHA zeolite catalyst compositions characterized by relatively small domain size (e.g., less than about 1200 Å), low strain (e.g., less than about 0.40-0.45%), or both, provide enhanced $NO_x$ SCR performance at both low and high temperatures.

What is claimed is:

1. A zeolite material characterized by one or more of the following:
   a. a domain size of greater than 800 Angstroms (Å) and less than about 1500 Å;
   b. a crystallographic strain of less than about 0.7% as determined from the LY parameter from a General Structure Analysis System (GSAS) Rietveld refinement of powder X-ray diffraction data.

2. The zeolite material of claim 1, wherein the domain size is less than about 1400 Å.

3. The zeolite material of claim 1, wherein the domain size is less than about 1300 Å.

4. The zeolite material of claim 1, wherein the domain size is from 800 Å to about 1400 Å.

5. The zeolite material of claim 1, wherein the crystallographic strain is less than about 0.6%.

6. The zeolite material of claim 5, wherein the crystallographic strain is less than about 0.5%.

7. The zeolite material of claim 6, wherein the crystallographic strain is less than about 0.4%.

8. The zeolite material of claim 1, wherein the domain size is from 800 Å to about 1200 Å, and the crystallographic strain is from about 0.2% to about 0.6%.

9. The zeolite material of claim 1, wherein the domain size is from 800 Å to about 1100 Å, and the crystallographic strain is from about 0.3% to about 0.5%.

10. The zeolite material of claim 1, wherein the zeolite material is an aluminosilicate zeolite.

11. The zeolite material of claim 10, having a silica-to-alumina ratio (SAR) ranging from about 10 to about 45.

12. The zeolite material of claim 11, having a SAR ranging from about 15 to about 20.

13. The zeolite material of claim 1, wherein the zeolite material has a CHA crystalline framework.

14. The zeolite material of claim 1, wherein the zeolite material is chosen from SSZ-13, SSZ-62, natural chabazite, zeolite K-G, Linde D, Linde R, LZ-218, LZ-235, LZ-236, ZK-14, SAPO-34, SAPO-4, SAPO-47, and ZYT-6.

15. A selective catalytic reduction (SCR) catalyst composition effective for the abatement of nitrogen oxides (NOx) in an exhaust gas stream, the SCR catalyst composition comprising the zeolite material according to claim 1, promoted with a metal selected from iron, copper, and combinations thereof.

16. The SCR catalyst composition of claim 15, wherein the promoter metal is present in an amount ranging from about 1.0 wt % to about 10 wt %, based on the total weight of the SCR catalyst and calculated as the metal oxide.

17. The SCR catalyst of claim 15, wherein the promoter metal is present in an amount ranging from about 4 wt % to about 6 wt %.

18. The SCR catalyst composition of claim 15, wherein the promoter metal is copper.

19. An SCR catalyst article effective to abate nitrogen oxides (NOx) from a lean burn exhaust gas, the SCR catalyst article comprising a substrate having the selective catalytic reduction (SCR) catalyst composition according to claim 15, disposed on at least a portion thereof.

20. The SCR catalyst article of claim 19, wherein the substrate is a honeycomb substrate.

21. The SCR catalyst article of claim 19, wherein the honeycomb substrate is a flow-through substrate or a wall-flow filter.

22. The SCR catalyst article of claim 19, wherein at least a portion of the NOx in the exhaust gas stream is reduced to $N_2$ at a temperature between about 200° C. and about 600° C.

23. The SCR catalyst article of claim 22, wherein the NOx level in the exhaust gas stream is reduced by at least 50% at 200° C.

24. The SCR catalyst article of claim 22, wherein the NOx level in the exhaust gas stream is reduced by at least 70% at 600° C.

25. The SCR catalyst article of claim 19, wherein the SCR catalyst article, after a thermal aging treatment conducted at 800° C. for 16 hours in the presence of 10 vol % steam and the balance air, exhibits an abatement of the NOx in the exhaust gas stream of about 72% or greater at 200° C., about 81% or greater at 600° C., or both, when the SCR catalyst article is tested under the following conditions: the SCR catalyst composition is disposed on a cellular ceramic monolith having a cell density of 400 cpsi and a wall thickness of 6 mil at a catalyst loading of 2.1 g/in$^3$, at an exhaust gas hourly volume-based space velocity of 80,000 h$^{-1}$ under pseudo-steady state conditions, the exhaust gas comprising a gas mixture of 500 ppm NO, 500 ppm $NH_3$, 10% $O_2$, 5% $H_2O$, and the balance $N_2$.

26. An exhaust gas treatment system comprising the SCR catalyst article according to claim 19, positioned downstream from and in fluid communication with a lean burn engine that produces an exhaust gas stream.

27. The exhaust gas treatment system of claim 26, further comprising one or more of the following:
   a. a diesel oxidation catalyst (DOC) positioned upstream of the SCR catalyst article;
   b. a soot filter positioned upstream of the SCR catalyst article;
   c. an ammonia oxidation catalyst (AMOx) positioned downstream of the SCR catalyst article.

28. A method of treating an exhaust gas stream from a lean burn engine, the method comprising contacting the exhaust gas stream with the catalyst article of claim 19 for a time and at a temperature sufficient to reduce the level of nitrogen oxides (NOx) in the exhaust gas stream.

29. The method of claim 28, wherein the $NO_x$ level in the exhaust gas stream is reduced to $N_2$ at a temperature between about 200° C. and about 600° C.

* * * * *